(12) United States Patent
Toda (10) Patent No.: US 10,046,827 B2
(45) Date of Patent: Aug. 14, 2018

(54) REACTION FORCE ADJUSTMENT SUPPORT DEVICE, METHOD THEREOF AND NON-TRANSITORY COMPUTER READABLE MEDIUM

(71) Applicant: Showa Corporation, Gyoda-shi (JP)

(72) Inventor: Tomoya Toda, Fukuroi (JP)

(73) Assignee: SHOWA CORPORATION, Gyoda-Shi (JP)

( * ) Notice: Subject to any disclaimer, the term of this patent is extended or adjusted under 35 U.S.C. 154(b) by 192 days.

(21) Appl. No.: 15/053,349

(22) Filed: Feb. 25, 2016

(65) Prior Publication Data
US 2016/0288866 A1    Oct. 6, 2016

(30) Foreign Application Priority Data

Mar. 31, 2015    (JP) .................................. 2015-074210

(51) Int. Cl.
*B62K 25/06*    (2006.01)
*B60K 35/00*    (2006.01)
(Continued)

(52) U.S. Cl.
CPC ............ *B62K 25/06* (2013.01); *B60G 17/018* (2013.01); *B60K 35/00* (2013.01);
(Continued)

(58) Field of Classification Search
CPC .. B60K 35/00; B60K 23/02; B60K 2350/352; B60K 2350/1072; B60K 2350/1028;
(Continued)

(56) References Cited

U.S. PATENT DOCUMENTS 5,156,231 A * 10/1992 Trema .................. B62K 25/005
   180/219
5,487,443 A *  1/1996 Thurm .................. B62K 25/00
   180/227
(Continued)

FOREIGN PATENT DOCUMENTS

EP         2357098 A     8/2011
EP         2669170 A    12/2013
(Continued)

OTHER PUBLICATIONS

Extended European Search Report dated Aug. 25, 2016 for the corresponding European Patent Application No. 16157524.6.
U.S. Appl. No. 29/534,518, Toda.

*Primary Examiner* — Mussa A Shaawat
(74) *Attorney, Agent, or Firm* — Leason Ellis LLP (57) ABSTRACT

A reaction force adjustment support device includes: a pressure data storage unit storing pressure data of respective spring chambers; a graphic user interface unit displaying a display screen; a reaction force calculator calculating reaction force data by using the pressure data of the respective spring chambers stored in the pressure data storage unit; a graph generating unit generating a graph of reaction force characteristics by using the reaction force data calculated by the reaction force calculator; and a controller displaying a screen for adjusting a reaction force where the screen has an operation portion for adjusting spring pressures provided for the respective spring chambers and a drawing area of the graph on the display screen, and controlling the reaction force calculator and the graph generating unit by user's operation with respect to the operation portion with the pressure data changed for the respective spring chambers to vary the graph.

12 Claims, 6 Drawing Sheets

(51) Int. Cl.
*B60G 17/018* (2006.01)
*B62K 23/02* (2006.01)
*B62K 25/04* (2006.01)

(52) U.S. Cl.
CPC .... *B60G 2202/152* (2013.01); *B60G 2202/24* (2013.01); *B60G 2204/61* (2013.01); *B60G 2300/12* (2013.01); *B60G 2400/5182* (2013.01); *B60G 2400/51222* (2013.01); *B60G 2500/10* (2013.01); *B60G 2500/20* (2013.01); *B60G 2600/04* (2013.01); *B60G 2600/042* (2013.01); *B60G 2600/20* (2013.01); *B60K 2350/1028* (2013.01); *B60K 2350/1072* (2013.01); *B60K 2350/352* (2013.01); *B62K 23/02* (2013.01); *B62K 2025/044* (2013.01); *B62K 2201/08* (2013.01)

(58) Field of Classification Search
CPC .............. B60K 2025/044; B62K 25/06; B62K 2201/08; B62K 23/08; B60G 17/018; B60G 2600/20; B60G 2202/152; B60G 2202/24; B60G 2204/61; B60G 2300/12
See application file for complete search history.

(56) References Cited

U.S. PATENT DOCUMENTS

| | | | |
|---|---|---|---|
| 6,263,994 B1 * | 7/2001 | Eitel | B60T 5/00 180/219 |
| 2013/0320647 A1 * | 12/2013 | Awasa | B62K 21/02 280/276 |
| 2015/0108700 A1 * | 4/2015 | Sumida | B62K 25/28 267/221 |

FOREIGN PATENT DOCUMENTS

| | | |
|---|---|---|
| JP | 2012-092945 A | 5/2012 |
| WO | WO-2009/133000 A | 11/2009 |

\* cited by examiner

REACTION FORCE ADJUSTMENT SUPPORT DEVICE, METHOD THEREOF AND NON-TRANSITORY COMPUTER READABLE MEDIUM

CROSS-REFERENCE TO RELATED APPLICATIONS

This application is based on and claims priority under 35 USC 119 from Japanese Patent Application No. 2015-074210 filed on Mar. 31, 2015, the entire content of which is incorporated herein by reference.

BACKGROUND

1. Technical Field

The present invention relates to a reaction force adjustment support device, a method thereof and a non-transitory computer readable medium.

2. Related Art

In motocross (MX) which is one of motorcycle competitions, a suspension dedicated to MX is used. As the quality of suspension setting decides the issue, better setting is required.

In recent years, a suspension structure (combination of an air spring and an oil damper) is being adopted for suspensions dedicated to MX, in particular, for a front fork, which includes plural air chambers and using an air spring generating a reaction force by pressures of the air to be filled in respective air chambers (refer to JP-A-2012-092945 (Patent Document 1)).

SUMMARY OF THE INVENTION

In the case of the related-art suspension structure, the degree of freedom in the setting is increased as suspension setting (reaction force adjustment) suitable to the preference of a rider can be performed by adjusting air pressures of the plural air chambers, however, the reaction force adjustment becomes difficult for unaccustomed users with insufficient experience in adjustment, which causes a problem that it is difficult to adjust the reaction force as the user wishes.

In view of above, at least one embodiment of the present invention capable of performing desired reaction force adjustment easily regardless of user's experiment.

The at least one embodiment of the present invention provides a reaction force adjustment support device supporting reaction force adjustment of a suspension mechanism having plural spring chambers in which spring pressures can be individually adjusted, which includes a pressure data storage unit storing pressure data of the respective spring chambers, a graphic user interface unit displaying a display screen which can be directly operated by a user, a reaction force calculator calculating reaction force data by using the pressure data of the respective spring chambers stored in the pressure data storage unit, a graph generating unit generating a graph of reaction force characteristics by using the reaction force data calculated by the reaction force calculator and a controller displaying a screen for adjusting a reaction force where the screen has an operation portion for adjusting the spring pressures provided for the respective spring chambers and a drawing area of the graph on the display screen, and controlling the reaction force calculator and the graph generating unit by user's operation with respect to the operation portion with the pressure data changed for the respective spring chambers to vary the graph.

The at least one embodiment of the present invention also provides a non-transitory computer readable medium storing a program allowing a reaction force adjustment support device supporting reaction force adjustment of a suspension mechanism having plural spring chambers in which spring pressures can be individually adjusted to execute processing, which allows the reaction force adjustment support device to function as a pressure data storage unit storing pressure data of the respective spring chambers, a graphic user interface unit displaying a display screen which can be directly operated by a user, a reaction force calculator calculating reaction force data by using the pressure data of the respective spring chambers stored in the pressure data storage unit, a graph generating unit generating a graph of reaction force characteristics by using the reaction force data calculated by the reaction force calculator and a controller displaying a screen for adjusting a reaction force where the screen has an operation portion for adjusting the spring pressures provided for the respective spring chambers and a drawing area of the graph on the display screen, and controlling the reaction force calculator and the graph generating unit by user's operation with respect to the operation portion with the pressure data changed for the respective spring chambers to vary the graph.

The at least one embodiment of the present invention also provides a reaction force adjustment support method by a reaction force adjustment support device supporting reaction force adjustment of a suspension mechanism having plural spring chambers in which spring pressures can be individually adjusted, which includes storing pressure data of the respective spring chambers, calculating reaction force data by using the pressure data of the respective spring chambers stored in a pressure data storage unit when an instruction for drawing a graph of reaction force characteristics is made with respect to a graphic user interface unit displaying a display screen which can be directly operated by a user, generating the graph of the reaction force characteristics by using the calculated reaction force data, displaying a screen for adjusting a reaction force where the screen has an operation portion for adjusting the spring pressures provided for the respective spring chambers and a drawing area of the graph on the display screen and varying the graph by user's operation with respect to the graphic user interface unit with the pressure data changed for the respective spring chambers.

According to the at least one embodiment of the present invention, it is possible to perform desired reaction force adjustment by a user regardless of user's experience in adjusting air setting.

DESCRIPTION OF EMBODIMENTS

Figure 1:
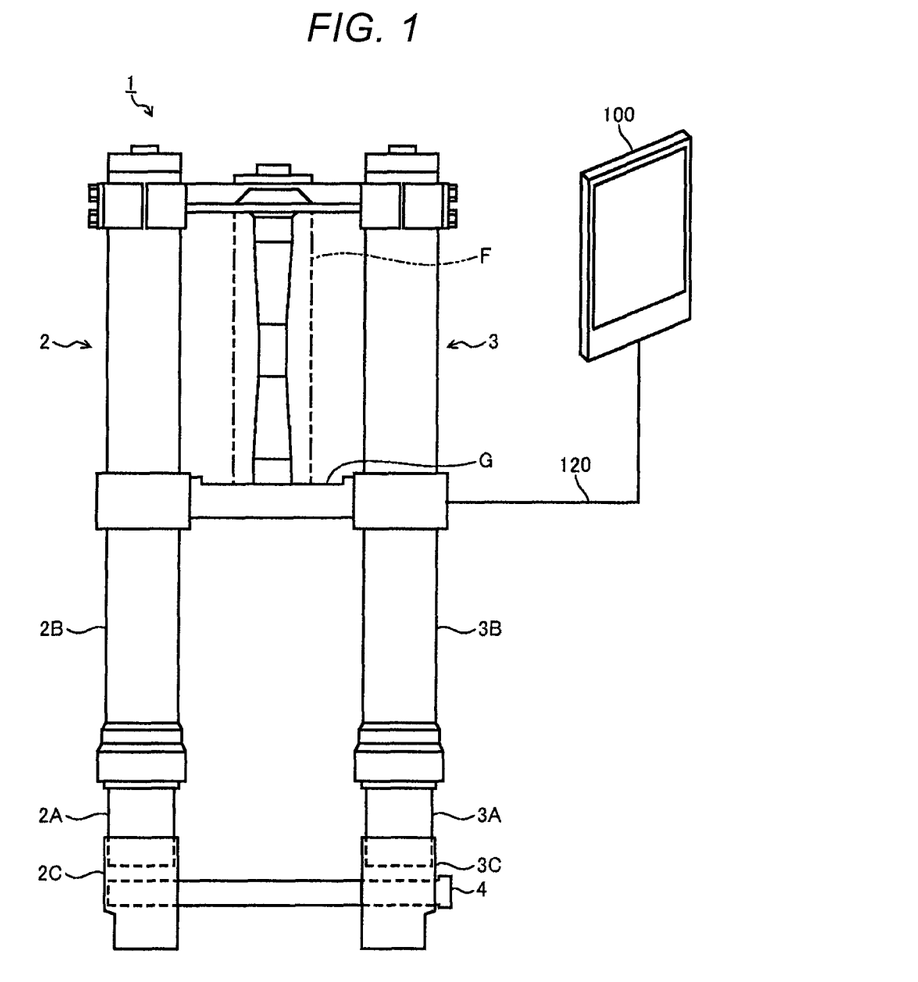
FIG. 1 is a view showing a structure of a suspension setting support system according to an embodiment.

Hereinafter, an embodiment of the present invention will be explained in detail with reference to the drawings. FIG.

Figure 2:
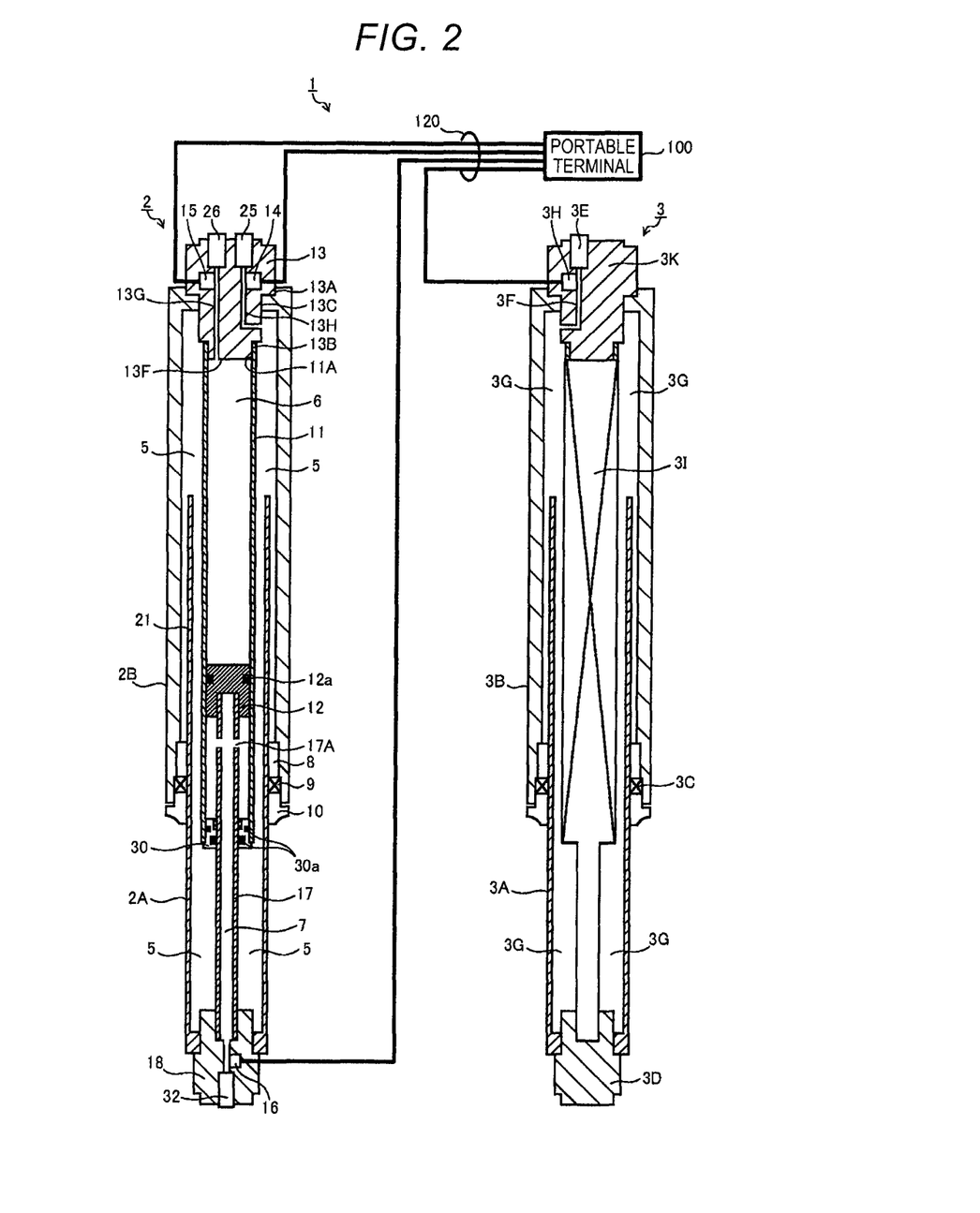
FIG. 2 is a view showing a specific example of a front fork of a motorcycle.

1 is a view showing a structure of a suspension setting support system according to an embodiment of the present invention. FIG. 2 is a view showing a specific example of a front fork of a motorcycle.

As shown in FIG. 1, the suspension setting support system according to the embodiment includes a portable terminal 100 as a reaction force adjustment support device which supports reaction force adjustment of the whole suspension by adjusting air pressures and oil quantities in respective spring chambers provided in the front fork of the motorcycle.

First, a schematic structure of the reaction force support system and the front fork of the motorcycle according to the embodiment will be explained with reference to FIG. 1 and FIG. 2.

As shown in FIG. 1, the reaction force adjustment support system according to the embodiment includes a front fork 1 and a portable terminal 100 as the reaction force adjustment support system connected to the front fork 1 through communication cables 120. The portable terminal 100 supports reaction force adjustment of a suspension mechanism including plural spring chambers, in which, for example, pressures of air springs and so on can be individually adjusted.

As shown in FIG. 2, the front fork 1 is arranged, for example, in a front wheel portion of the motorcycle for motocross, in which a spring leg 2 having a suspension spring by an air spring and a damper leg 3 including, for example, a damper 3I such as an oil damper are arranged in parallel.

The spring leg 2 includes a vehicle body side tube 2B, an axle side tube 2A, a cylindrical guide cylinder 11, an inside air spring chamber 6 sectioned by a piston 12 at an end portion of a guide rod 17 inside the guide cylinder 11, an outside air spring chamber 5 sectioned by the vehicle body side tube 2B and the axle side tube 2A at least in the outside of the inside air spring chamber 6 in the guide cylinder 11, a rod guide 30 provided in a lower end portion of the guide cylinder 11, into which the guide rod 17 is inserted and which supports the guide rod 17, the piston 12 supported by the guide rod 17 slidably with respect to the guide cylinder 11, a rebound air chamber 7 (hereinafter referred to "balance chamber 7") sectioned by being sandwiched between the guide cylinder 11 and the guide rod 17, an inside air pressure adjusting portion 26 for adjusting an air pressure of the inside air spring chamber 6, an outside air pressure adjusting portion 25 for adjusting an air pressure of the outside air spring chamber 5 and a rebound air pressure adjusting portion 32 for adjusting an air pressure of the balance chamber 7.

That is, the spring leg 2 is configured by inserting the vehicle body side tube 2B and the axle side tube 2A to each other, providing the guide cylinder 11 in the center inside one of the vehicle body side tube 2B and the axle side tube 2A and inserting the guide rod 17 provided in the center inside the other of the vehicle body side tube 2B and the axle side tube 2A into the guide cylinder 11.

The vehicle body side tube 2B is fixed to the vehicle body side and one end thereof is closed. An axle is attached to the axle side tube 2A, and one end thereof is closed. The axle side tube 2A and the vehicle body side tube 2B are provided so as to be slidable to each other, including the outside air spring chamber 5, the inside air spring chamber 6 and the balance chamber 7 thereinside. Accordingly, the spring leg 2 forms a suspension spring by an air spring of the inside air spring chamber 6, an air spring of the outside air spring chamber 5 and an air spring of the balance chamber 7.

The cylindrical guide cylinder 11 is configured by inserting the axle side tube 2A and the vehicle body side tube 2B to each other, which is extended from the closed end of the axle side tube 2B and arranged in an inner peripheral space.

The guide rod 17 is extended from the closed end of the axle side tube 2A. The piston 12 is attached to a tip of the guide rod 17 so as to be slidable on an inner peripheral surface of the guide cylinder 11.

The inside air spring chamber 6 is sectioned in a side where the guide rod 17 does not exist in the guide cylinder 11. The inside air spring chamber 6 is hermetically sealed between a sealing member 12a in the piston 12 provided relative to an inner periphery of the guide cylinder 11 and a cap bolt 13 provided in an upper end of the guide cylinder 11.

The outside air spring chamber 5 is a space sectioning the outer side of the guide cylinder 11 in the vehicle body side tube 2B and the axle side tube 2A. The vehicle body side tube 2B and the axle side tube 2A hermetically slide each other through a sealing member 9 called an oil seal provided in a sliding portion. An upper portion of the outside air spring chamber 5 is closed by screwing the cap bolt 13 at an opening of the vehicle body side tube 2B.

In other words, the outside air spring chamber 5 is a space formed by slidably sealing spaces of the vehicle body side tube 2B and the axle side tube 2A by a sliding member 8 called a slide metal, the sealing member 9 and a dust seal 10, which are provided in an inner periphery of an opening end side of the vehicle body side tube 2B.

The sliding member 8 is a cylindrical body with a given thickness which is fitted to a concave portion provided in the inner periphery of the opening end side of the vehicle body side tube 2B, which slidably supports the axle side tube 2A with respect to the vehicle body side tube 2B.

The sealing member 9 is provided closer to the opening end side of the vehicle body side tube 2B as compared with the sliding member 8. The sealing member 9 seals a gap between the inner periphery of the vehicle body side tube 2B and the outer periphery of the axle side tube 2A to thereby prevent pressure leaking from the outside air spring chamber 5 to the outside.

Moreover, the dust seal 10 for protecting the sealing member 9 so that foreign matters do not enter from the outside is provided closer to the end portion side of the vehicle body side tube 2B as compared with the sealing member 9.

Therefore, the sliding member 8 and the sealing member 9 seal between the inner peripheral space of the vehicle body side tube 2B and the outer peripheral space of the axle side tube 2A.

The rod guide 30 seals the space between an outer peripheral surface of the guide rod 17 and the inner peripheral surface of the guide cylinder 11, and supports the guide rod 17.

As explained in detail below, the balance chamber 7 is hermetically sealed by a sealing member 30a in the rod guide 30 provided relative to the outer periphery of the guide rod 17 and the sealing member 12a in the piston 12 provided relative to the inner periphery of the guide cylinder 11.

The balance chamber 7 is formed in a space between the guide cylinder 11 and the guide rod 17 thereinside and in the inside of the guide rod 17. The air is circulated to the respective spaces through a through hole 17A provided in the guide rod 17.

The air spring of the balance chamber 7 is compressed in an expansion side where the vehicle body side tube 2B and the axle side tube 2A are biased by spring forces of the air springs of the inside air spring chamber 6 and the outside air spring chamber 5, and a spring force of the air spring of the balance chamber 7 biases the vehicle body side tube 2B and the axle side tube 2A in a contraction direction against the spring force of the air spring of the inside air spring chamber 6 and the spring force of the air spring of the outside air spring chamber 5.

The guide cylinder 11 is a cylindrical body having a smaller diameter than an inner diameter of the axle side tube 2A. The guide cylinder 11 includes a screw portion 11A in an inner periphery on one end side, which is screwed to the cap bolt 13 closing the end portion of the vehicle body side tube 2B to be fixed to the closing end side coaxially with the shaft center of the vehicle body side tube 2B.

The cap bolt 13 is a stepped cylindrical screw body formed in a stepped shape by coaxially overlapping cylinders having different outer shape, having a large diameter screw portion 13A screwed to the vehicle body side tube 2B, a small-diameter screw portion 13B screwed to the guide cylinder 11 and an end face abutting portion 13C contacting an end face of the guide cylinder 11.

The end face abutting portion 13C is formed between the large diameter screw portion 13A and the small diameter screw portion 13B. The end face abutting portion 13C has the diameter larger than the outer diameter of the guide cylinder 11, which protrudes inside the inner space of the vehicle body side tube 2B with the small diameter screw portion 13B. An outer peripheral surface of the end face abutting portion 13C is formed as a straight surface without processing of threading.

Accordingly, the large diameter screw portion 13A of the cap bolt 13 is screwed to the vehicle body side tube 2B, and the small diameter screw portion 13B is screwed to the screw portion 11A of the guide cylinder 11, thereby positioning the guide cylinder 11 in the center in the inner space of the vehicle body side tube 2B. The end face of the guide cylinder 11 screwed to the small diameter screw portion 13B abuts on the lower end of the end face abutting portion 13C, thereby closing one end of the guide cylinder 11.

The cap bolt 13 includes the outside air pressure adjusting portion 25 which adjusts the air pressure of the outside air spring chamber 5, a communication hole 13H connecting the outside air spring chamber 5 to the outside air pressure adjusting portion 25, the inside air pressure adjusting portion 26 which adjusts the air pressure of the inner side air spring chamber 6, a communication hole 13G connecting the inside air pressure adjusting portion 26 to the inner air spring chamber 6, a pressure sensor 14 provided so as to contact the communication hole 13H and a pressure sensor 15 so as to contact the communication hole 13G.

The pressure sensor 14 detects the pressure of the outside air spring chamber 5 through the communication hole 13H. The pressure sensor 15 detects the pressure of the inside air spring chamber 6 through the communication hole 13G. The communication cables 120 are respectively connected to respective pressure sensors 14 and 15 and are pulled out from the cap bolt 13 to the outside.

A bottom bolt 18 includes the rebound air pressure adjusting portion 32 which adjusts the air pressure of the balance chamber 7 and a pressure sensor 16. The pressure sensor 16 is provided so as to contact a passage between the rebound air pressure adjusting portion 32 and the balance chamber 7, which detects the pressure (air pressure) of the balance chamber 7. The communication cable 120 pulled out from a side face of the bottom bolt 18 is connected to the pressure sensor 16.

The rebound air pressure adjusting portion 32 is for adjusting the air pressure of the balance chamber 7. The rebound air pressure adjusting portion 32 is a valve exposed at an end face of the bottom bolt 18 in a tool engaging portion's side and enables taking-in/out of the air inside the balance chamber 7 from the outside.

As shown in FIG. 2, the damper leg 3 is configured by arranging a sealing member 3C between a vehicle body side tube 3B and an axle side tube 3A to seal them, slidably inserting the axle side tube 3A into the vehicle body side tube 3B and arranging, for example, a single cylindrical damper 3I inside the axle side tube 3A and the vehicle body side tube 3B.

The damper 3I generates a damping force for suppressing a sudden expanding/contracting vibration. Due to the damping force, the expanding/contracting vibration of the axle side tube 3A and the vehicle body side tube 3B caused by absorption of an impact force by the air spring of the suspension spring of the spring leg 2 is suppressed.

The vehicle body side tube 3B is supported in the vehicle body side and the axle side tube 3A is connected to the axle side. An opening end in an upper end of the vehicle body side tube 3B is closed and sealed by a fork bolt 3K. An upper end portion of the damper 3I is fixed to the fork bolt 3K.

An axle bracket 3D is screwed to an opening in a lower end portion of the axle side tube 3A to close the opening. Sections of an outer chamber 3G exist between the axle side tube 3A and the damper 3I and between the vehicle body side tube 3B and the damper 3I.

The outer chamber 3G is sealed by the vehicle body side tube 3B, the fork bolt 3K, the axle side tube 3A, the axle bracket 3D, the sealing member 3C and so on.

The fork bolt 3K includes an outer chamber air pressure adjusting portion 3E which adjusts the air pressure of the outer chamber 3G, a communication hole 3F which connects the outer chamber air pressure adjusting portion 3E to the outer chamber 3G and a pressure sensor 3H provided so as to contact the communication hole 3F.

The pressure sensor 3H detects the pressure of the outer chamber 3G through the communication hold 3F. The communication cable 120 is connected to the pressure sensor 3H, which is pulled out from the fork bolt 3K to the outside. The air pressure detected by the pressure sensor 3H is transmitted to the portable terminal 100 through the communication cable 120.

That is, pressure data of respective spring chambers detected by the above pressure sensors 14, 15, 16 and 3H is taken by the portable terminal 100 through the communication cables 120.

Figure 3:
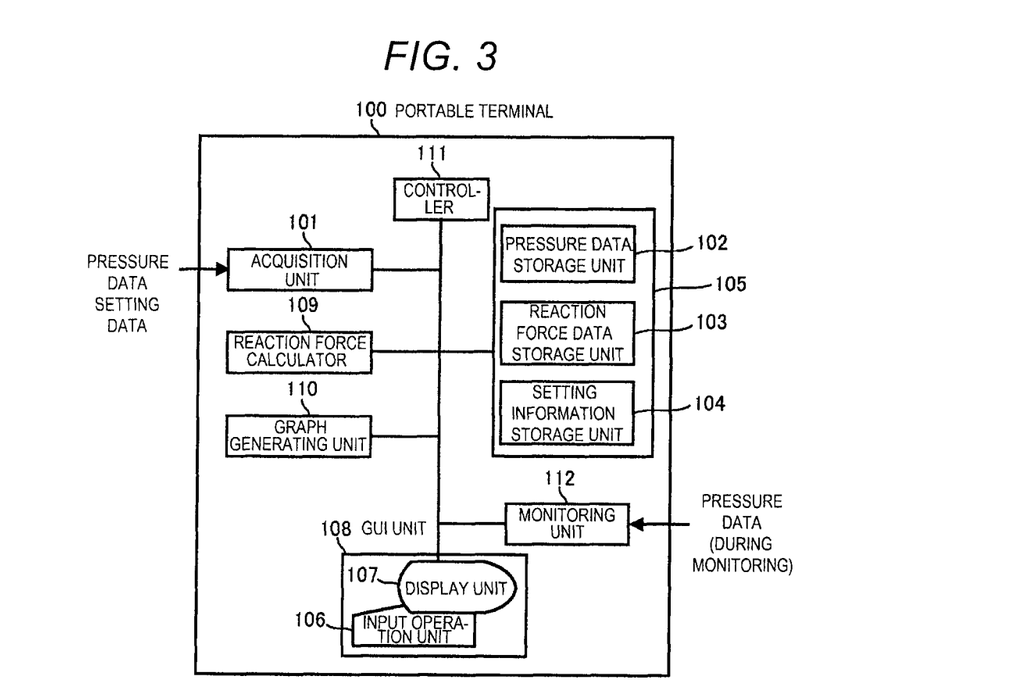
FIG. 3 is a diagram showing a configuration of a portable terminal.
Figure 4:
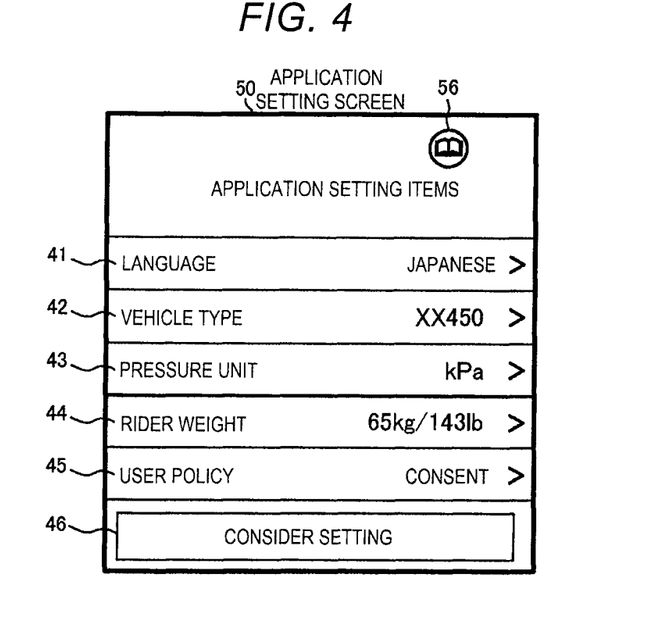
FIG. 4 is a view showing an application setting screen.
Figure 5:
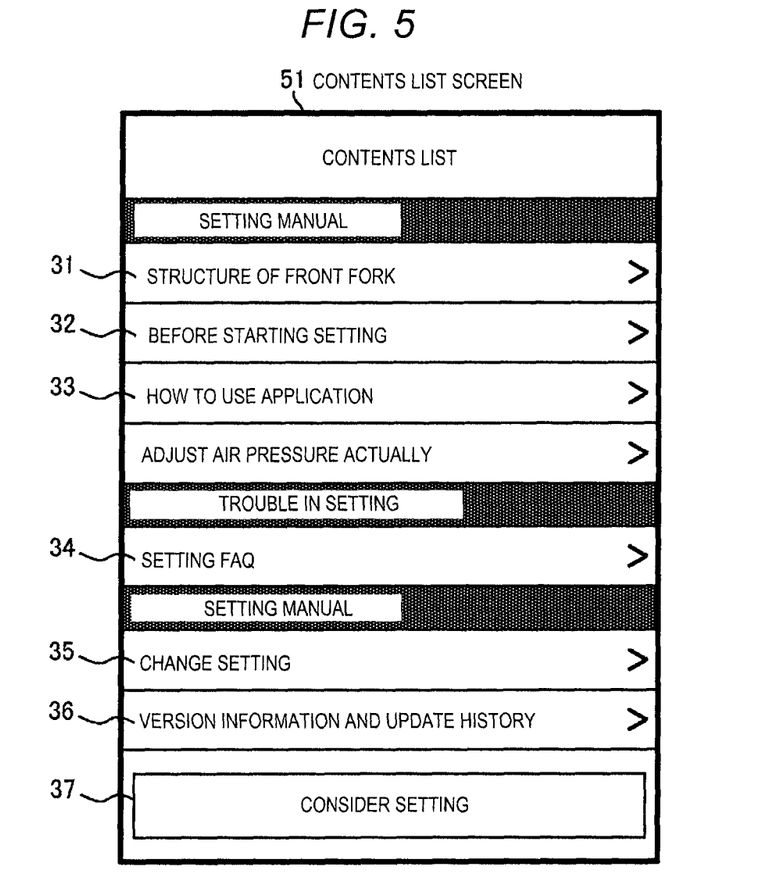
FIG. 5 is a view showing a contents list screen.
Figure 6:
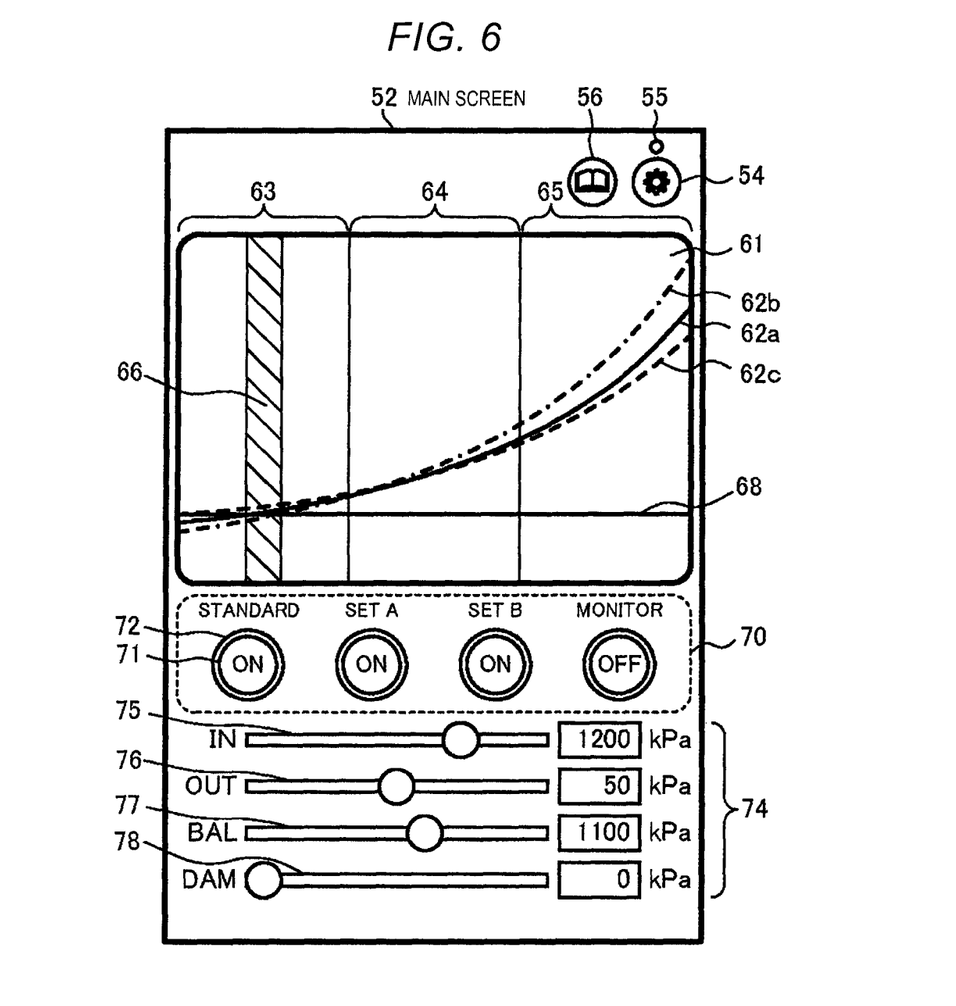
FIG. 6 is a view showing a main screen.

Subsequently, a configuration of the portable terminal 100 will be explained with reference to FIG. 3. FIG. 3 is a diagram showing the configuration of the portable terminal. FIG. 4 is a view showing an application setting screen. FIG. 5 is a view showing a contents list screen. FIG. 6 is a view showing a main screen.

The portable terminal 100 is a portable computer including a memory, a CPU, a touch panel, an external communication interface and so on. The CPU reads a program stored in the memory and executes processing of the program to thereby allow the portable terminal 100 to operate (function) as the reaction force adjustment support device. The portable terminal 100 supports the reaction force adjustment by adjusting air pressures of respective spring chambers of the spring leg 2 and the damper leg 3 of the front fork 1.

As shown in FIG. 3, the portable terminal 100 includes, as functional components, an acquisition unit 101, a storage unit 105 having a pressure data storage unit 102, a reaction force data storage unit 103 and a setting information storage unit 104, a graphic user interface unit 108 (hereinafter referred to a "GUI unit 108") in which an input operation unit 106 is integrated with a display unit 107, a reaction force calculator 109, a graph generating unit 110, a controller 111, a monitoring unit 112 and so on.

The acquisition unit 101 stores setting data of the suspension and the program inputted as initial values from the outside (initial setting data of the suspension, data displayed in application setting items as a pull-down menu) in the setting information storage unit 104. The acquisition unit 101 stores standard pressure data (initial data of air pressures of respective spring chambers (pressure data)) inputted from the outside as initial values in the pressure data storage unit 102.

The GUI unit 108 displays display screens (FIG. 4 to FIG. 6) which can be operated by being directly touched by a user's finger.

The setting information storage unit 104 stores data of contents (user manual and so on) corresponding to selection by the user in the contents list screen 51 and various kinds of data of application setting items (language setting, vehicle type setting, pressure unit, consent flag of user policy, rider weight and so on) set by the user in the application setting screen 50.

The reaction force calculator 109 reads the pressure data of respective spring chambers stored in the pressure data storage unit 102 and calculates reaction force data by using the read pressure data of respective spring chambers and setting data registered in the setting information storage unit 104. That is, the reaction force calculator 109 calculates reaction force data by using pressure data of respective spring chambers stored in the pressure data storage unit 102.

The reaction force data storage unit 103 stores the reaction force data calculated by the reaction force calculator 109. The reaction force data storage unit 103 also stores reaction force data (standard data) for generating a standard reaction force curve to be displayed on the main screen 52 in advance, and further stores reaction force data for generating reaction force curves adjusted and set so as to correspond to each user (reaction force data of custom setting) and so on.

The graph generating unit 110 generates the reaction force curve as a graph of reaction force characteristics by using the reaction force data read from the reaction force data storage unit 103 and displays the reaction force curve on the display unit 107 of the GUI unit 108.

The graph generating unit 110 generates a reaction force curve by using pressure data of custom setting stored in the pressure data storage unit 102 in accordance with display operation (ON-operation of a button 71 of FIG. 6) of the reaction force curve performed with respect to the custom setting of the user, displaying the reaction force curve on a drawing area (a characteristics display screen 61 of FIG. 6).

When the user injects the air for adjusting pressures in the respective spring chambers, a "MONITOR" button on the main screen 52 is operated, thereby operating the monitoring unit 112 and switching the function of the portable terminal 100 to a monitor function. Accordingly, the monitoring unit 112 monitors the air pressures of the respective spring chambers obtained from respective pressure sensors 14, 15, 16 and 3H through the communication cables 120 and displays these values on the main screen 52 (see FIG. 6) while temporarily storing these values in the pressure data storage unit 102.

That is, the monitoring unit 112 sequentially displays pressure data obtained from the pressure sensors 14, 15, 16 and 3H provided in the respective spring chambers on the main screen 52 (see FIG. 6) in accordance with the monitoring operation performed with respect to the GUI unit 108.

The controller 111 comprehensively controls respective units. The controller 111 displays the contents list screen 51 (see FIG. 5), the application setting screen 50 (see FIG. 4), the main screen 52 (see FIG. 6) as a main screen for considering the reaction force adjustment and so on in accordance with the user's operation with respect to (the input operation unit 106) of the GUI unit 108.

That is, the controller 111 displays the screen for adjusting the reaction force (the main screen 52 of FIG. 6) including an operation portion (slide bars 75 to 78 of FIG. 6) for adjusting spring pressures provided for the respective spring chambers and the drawing area of reaction force curves (characteristics display screen 61 of FIG. 6) of reaction force curves on the display screen.

The controller 111 allows the graph generating unit 110 to regenerate a reaction force curve with an air pressure changed by an input operation of the user with respect to the input operation unit 106 in the main screen 52 and draws the reaction force curve on the characteristic display screen 61 (drawing area).

Specifically, the controller 111 changes pressure data for respective spring chambers by sliding operations of the user with respect to the slide bars 75 to 78 and controls the reaction force calculator 109 and the graph generating unit 110 with the changed pressure data of the respective spring chambers to vary the reaction curves on the characteristics display screen 61.

The controller 111 stores reaction force data including the changed pressure data of the respective spring chambers in the pressure data storage unit 102 as the custom setting of the user as needed.

As shown in FIG. 6, on the main screen 52, there are provided a slide operation portion 74 including the slide bars 75 to 78 and numeral columns as operation objects for adjusting air pressures provided for respective spring chambers, the characteristic display screen 61 (drawing area) on which reaction curves 62a to 62c generated by the graph generating unit 110 are drawn, a bottom 54 for switching the screen to the application setting screen 50 (see FIG. 4) and a menu button 56 for changing the screen to the contents list screen 51 (see FIG. 5) and so on are provided.

The numeral columns have a function of displaying monitoring values such as pressure values and oil quantities of respective spring chambers monitored by the monitoring unit 112 when monitoring air pressures and so on.

In the characteristics display screen 61, the vertical axis indicates the load and the horizontal axis indicates the stroke, in which the area of the stroke is divided into large three areas which are an initial area 63, a middle area 64 and a bottom area 65.

In the characteristics display screen 61, a left end of the horizontal axis (stroke axis) represents the most expanded state of the suspension and a right end of the stroke axis represents the contracted state of the suspension. The initial area 63 indicates a range of strokes in which the suspension moves in an uneven ground in a relatively flat course when the rider rides this kind of vehicle while putting his/her weight.

The middle area 64 indicates a moving range of the suspension (range of strokes) at the time of running on a middle-degree uneven course, breaking and so on. The bottom area 65 indicates a moving range of the suspension (range of strokes) at the time of landing of jumps.

Also on the characteristics display screen 61, a weight line 68 in the horizontal direction and a target area 66 in the vertical direction are displayed. The weight line 68 in the horizontal direction indicates the load applied to the front fork by the load of the rider (a weight including a weight of the rider and a weight of equipment) who rides this kind of vehicle.

The target area 66 in the vertical direction indicates the desired position of the stroke when the suspension sinks in the state where the rider rides this kind of vehicle. Therefore, when the user has a standard weight, the standard reaction curves 62a will be a curve passing a crossing portion (intersection) between the horizontal weight line 68 and the vertical target area 66.

In right ends of respective slide bars 75 to 78, numerals and a unit corresponding to positions of respective slide bars 75 to 78 are displayed. Numerals can be directly inputted by tapping the numerals.

The slide bar 75 is for adjusting the air pressure of the inside air spring chamber 6 (which is displayed as "IN" on the screen) in the spring leg 2. The slide bar 76 is for adjusting the air pressure of the outside air spring chamber 5 (which is displayed as "OUT" on the screen) in the spring leg 2.

The slide bar 77 is for adjusting the air pressure of the balance chamber 7 (which is displayed as "BAL" on the screen) in the spring leg 2. The slide bar 78 is for adjusting the air pressure of the outer chamber 3G (which is displayed as "DAM" on the screen) in the damper leg 2.

Additionally, the main screen 52 displays a switch portion 70 for switching plural settings ("standard" (displayed as "STANDARD" in FIG. 6), "setting A" (displayed as "SET A" in FIG. 6), "setting B" (displayed as "SET B" in FIG. 6) and so on) and for operating "monitor function of air pressure" (displayed as "MONITOR" in FIG. 6) at the time of injecting the air.

The respective buttons in the switch portion 70 are provided for designating a manner of displaying reaction force curves 62a to 62c to be displayed on the characteristics display screen 61 by the user and for indicating the correspondence between the reaction force curves 62a to 62c and respective switches currently displayed on the characteristics display screen 61 to the user.

The reaction force curve 62a is a reaction force curve drawn (generated) from reaction force data of "standard" (standard setting) which is previously registered in the storage unit 105. The reaction force curve 62b is a reaction force curve drawn (generated) from reaction force data of "setting A". The reaction force curve 62c is a reaction force curve drawn (generated) from the reaction force data of "stetting B".

The button 71 and a state display portion 72 provided around the button 71 are provided in each setting ("standard", "setting A", "setting B" or the like) of the switch portion 70. Numerals are given only to the "STANDARD" in FIG. 6, however, the same applies to "SET A", "SET B" and "MONITOR". The button 71 is a switch for activating the selectively-operated slide bar for the setting to thereby enable the modification of pressure data of respective spring chambers.

The setting of "STANDARD" is a fixed value, and the standard reaction force curve 62a is drawn (displayed) on the characteristics display screen 61 and numerals are displayed on the numeral display portion when the button 71 is selectively operated, which does not vary.

The state display portion 72 is for indicating that the button 71 has been selectively operated and the setting thereof has been activated.

Display/hide of the reaction force curves 62a to 62c can be switched by continuously operating (pressing) the button 71. In the case where three settings such as "STANDARD", "SET A" and "SET B" exist as in the example, three reaction force curves are displayed on the characteristics display screen 61 when all buttons 71 are turned on. That is, the bottom 71 functions as a switching operation unit which switches between display/hide of reaction curves 62a to 62c generated by the graph generating unit 110 in respective settings.

Furthermore, an alert display portion 55 is provided on the main screen 52. The alert display portion 55 flashes when there is an item not entered at the time of setting the application, thereby notifying the user of that.

Here, screens to be displayed on the portable terminal 100 will be explained with reference to FIG. 4 and FIG. 5.

In the case of the suspension setting support system according to the embodiment, the application setting screen 50 as shown in FIG. 4 is displayed at the initial startup. In the application setting screen 50, a language setting button 41, a vehicle type setting button 42, a pressure unit setting button 43, a rider weight setting button 44, a user policy button 45, a consideration button 46, a menu button 56 for opening the contents list screen 51 and so on are provided.

The language setting button 41 is a button for setting the language used in the program, and a pull-down menu containing Japanese, English and so on is displayed when operated, from which a desired language can be selected.

The vehicle type button 42 is a button for setting the vehicle type of the motorcycle to be considered, and a pull-down menu containing the vehicle type list including XX450, XY450 XY250 and so on is displayed when operated. A desired vehicle type can be selected from the menu. The consideration button 46 as a link to the main menu 52 is not activated until the vehicle type is not selected.

The pressure unit setting button 43 is a button for setting the unit of the pressure, and a pull-down menu containing a list including units of pressures including kPa, bar, kgf/cm$^2$, psi (lbf/in$^2$) and so on is displayed when operated, from which a desired unit of the pressure can be selected.

The rider weight setting button 44 is a button for setting the weight of the rider including the equipment, and a pull-down menu containing a numerals list of weights including 65 kg/143 lb and so on is displayed when operated, from which a desired weight can be selected.

The user policy button 45 is a button displaying a user policy of the application program operated on the terminal and promoting the consent with respect to the user policy concerning the application program to the user. When the operation of consent is not performed, the consideration button 46 as the link to the main screen 52 is not activated and process does not proceed.

When the consideration button 46 is operated by the user, the display is switched to the main screen 52, and the setting of the suspension of the selected vehicle type can be considered. In the case where the consent of the user policy and the selection of the vehicle type are not performed, the consideration button 46 does not function.

When the button 56 of the application setting screen 50 is tapped by the user, the controller 111 displays the contents list screen 51 as shown in FIG. 5 on the GUI portion 108 of the portable terminal 100.

On the content list screen 51, buttons 31 to 37 for linking to the contents stored in the portable terminal 100 are provided, and the linked contents are displayed by a touch operation of the buttons 31 to 37 by the user.

That is, the content list screen 51 includes a button group which realizes the access to information concerning setting including the reaction force adjustment and the selection operation for switching the function by the user.

According to the contents list screen 51, information concerning user's request can be obtained by operating any of the buttons 31 to 37 even when the user is not accustomed to the air suspension and the operation itself of the terminal.

For example, in the buttons 31 to 33 of setting manual items, collections of text indicating a series of settings are displayed. Marks are added when the text is unread. In the button 34, questions and answers collections to be referred when the user has a trouble in the setting are displayed. In the button 35, the application setting screen 50 (see FIG. 4) is displayed, in which the application setting which has been already set can be changed.

In the button 36, version information and update history of the program operating on the portable terminal 100 are displayed. In the button 37, the display is switched to the main screen 52 when tapped by the user, in which the setting of the suspension of the selected vehicle type can be considered.

Figure 7:
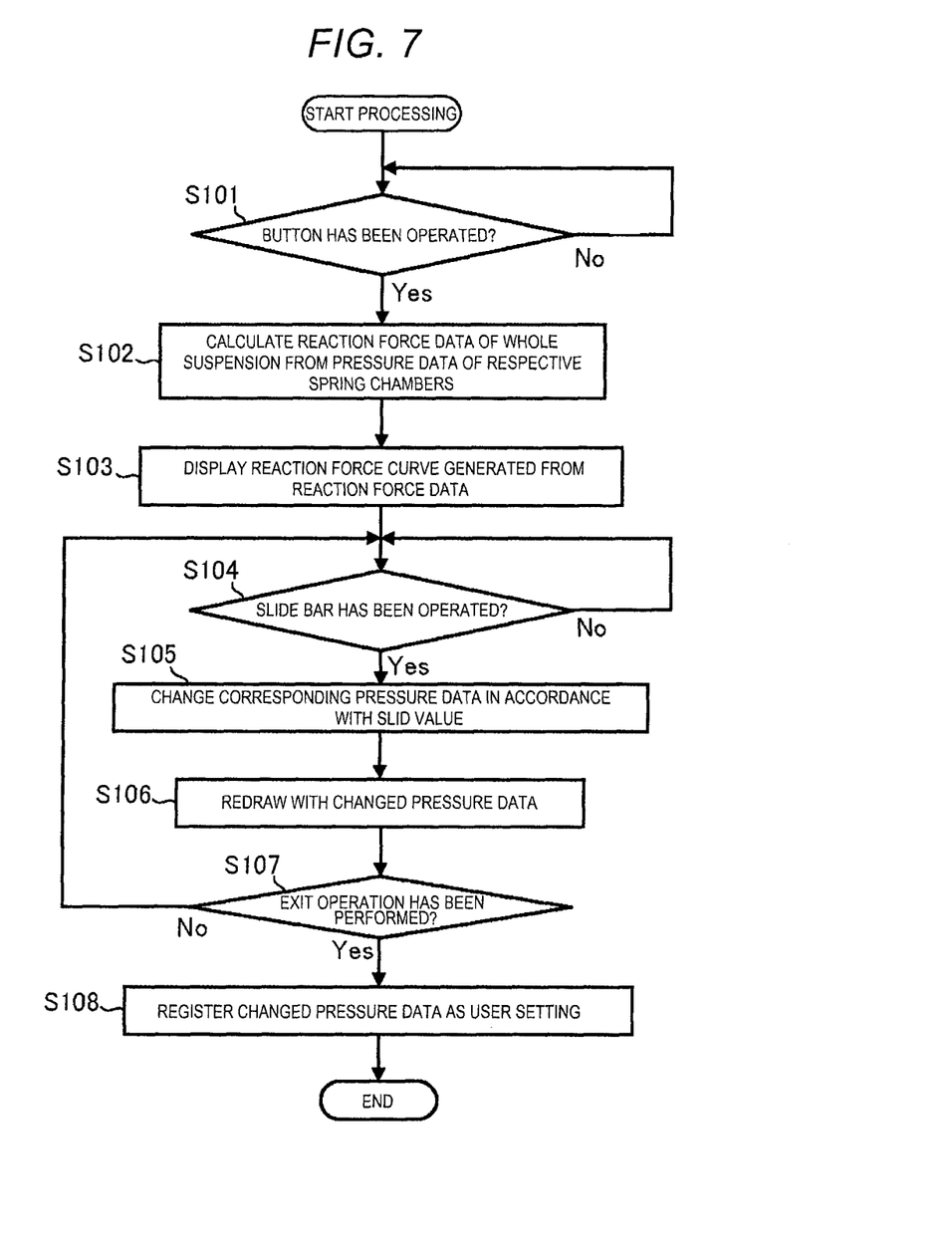
FIG. 7 is a flowchart indicating an operation of the portable terminal.

Hereinafter, processing in the main screen 52 (see FIG. 6) of the portable terminal 100 after the initial setting will be explained with reference to a flowchart of FIG. 7. FIG. 7 shows the flowchart indicating the operation of the portable terminal.

When the consideration button 46 is operated in the application setting screen 50 (see FIG. 4), the main screen 52 as shown in FIG. 6 is displayed on the portable terminal 100.

When the button 71 of, for example, the setting "SET A" is tapped in the main screen 52 displayed on the portable terminal 100 to turn on the switching of ON/OFF, the controller 111 determines that the button has been operated for adjusting the reaction force (Step S101 of FIG. 7), making the setting "SET A" changeable, lighting the state display portion 72 and instructing the reaction force calculator 109 to calculate the reaction force data.

The reaction force calculator 109 receiving the above instruction reads pressure data and oil quantity data of the respective spring chambers in the setting "SET A" from the pressure data storage unit 102 and calculates the reaction force as the whole suspension mechanism (Step S102), then, temporarily stores the calculated reaction force data in the reaction force data storage unit 103.

In the case where data is not set (stored) in the setting "SET A" in advance, the representative pressure data previously registered as the initial value is read out to calculate the reaction force.

Subsequently, the graph generating unit 110 reads the reaction force data calculated by the reaction force calculator 109 from the reaction force data storage unit 103, generates a reaction force curve as a graph of reaction force characteristics by using the read reaction force data and displays the reaction force curve on (the display unit 107) the GUI unit 108 (Step S103).

Here, when the user slides the slide bars 75 to 78 of desired spring chambers (Yes of Step S104), the controller 111 changes respective pressure data in accordance with the slid amounts of movement (Step S105), displays numerals in the numeral columns beside corresponding slide bars 75 to 78, instructs the reaction force calculator 109 to calculate the reaction force with the changed pressure data and further, instructs the graph generating unit 110 to redraw (re-display) the reaction force curve on (the display portion 107) the GUI unit 108 (Step S106).

When the user who has confirmed the reaction force curve redrawn (re-displayed) by the operation of the slide bars 75 to 77 performs the exit operation, for example, by tapping the menu button 56 to go to the contents list screen 51 (Yes of Step S107), the controller 111 registers (stores) the changed pressure data of the setting "SET A" in the pressure data storage unit 102 as the user setting "SET A", and ends the processing.

The above example of the operation is an example and it is possible to change the operation in various manners by replacing the respective steps, adding a new step or deleting part of steps.

In the above-described suspension setting support system according to the embodiment, the following advantages can be obtained by displaying the slide bars 75 to 78 for adjusting the pressure provided for respective spring chambers and the character display screen 61 displaying reaction force curves characteristics of which vary in accordance with the sliding operation of respective slide bars 75 to 78.

The user can easily get the image of air setting by giving the user information of reaction force curves.

When the slide bars 75 to 78 are slid (varied) by a finger, the reaction force curve moves in conjunction with the sliding, therefore, the user can easily recognize effects given to the reaction force of the whole suspension mechanism by variation of pressures in the respective spring chambers.

As the user can draw the ideal reaction force curves freely by using the slide bars 75 to 78, and pressures of the respective spring chambers at that time are given to the user by numeral values, the user can easily consider the air setting.

When the user actually injects air into respective spring chambers as a result of consideration, the portable terminal 100 itself functions as the pressure monitor by switching the function of the portable terminal 100 to the monitor function, therefore, it is not necessary to prepare a relatively expensive air injection pump with a gauge.

According to the above, the difficulty in setting is reduced and the user can easily perform desired reaction force adjustment regardless of adjustment experience in air setting.

As another additional advantage, the frequency of air check is increased as the air check becomes easy due to the monitor function, which can prevent the running with a dangerous pressure value in advance.

The embodiment of the present invention has been explained. However, the embodiment has been described as an example and the present invention can be realized in other various forms, in which omission, replacement and alternation of components may occur within a range not departing from the gist of the invention.

For example, the pressure sensors 14, 15, 16 and 3H attached to the front fork 1 may be connected to the portable terminal 100 by wireless communication.

It is also preferable to attach a sensor for detecting oil quantities to be added to the respective air spring chambers (the outside air spring chamber 5, the inside air spring chamber 6, the balance chamber 7 and the outer chamber 3G) of the front fork 1 to thereby add the element of the oil quantity to the setting items.

It is further preferable that the respective components of the portable terminal 100 described in the above embodiment are realized by installing a program in a storage such as a hard disk device of a computer, or that the functions of the present invention are realized by storing the program in computer readable electronic media and reading the program by the computer from the electronic media.

The electronic media include, for example, recording media such as a CD-ROM, a flash memory, removable media and so on. It is also preferable that the functions of the present invention are realized by storing the components of the portable terminal 100 separately in different computers connected through a network and by performing communication between the computers functioning as respective components.

What is claimed is:

1. A portable terminal for supporting reaction force adjustment of a suspension mechanism having plural spring chambers in which spring pressures can be individually adjusted, comprising:
   a pressure data storage unit storing pressure data of the respective spring chambers;
   a graphic user interface unit displaying a display screen which can be directly operated by a user;
   a reaction force calculator calculating reaction force data by using the pressure data of the respective spring chambers stored in the pressure data storage unit;
   a reaction force data storage storing the reaction force data calculated by the reaction force calculator;
   a graph generating unit generating a graph of reaction force characteristics by using the reaction force data calculated by the reaction force calculator; and
   a controller displaying a screen for adjusting a reaction force where the screen has an operation portion for adjusting the spring pressures provided for the respective spring chambers and a drawing area of the graph on the display screen, wherein
   the graph of reaction force characteristics includes a reaction force curve,
   the controller is configured to: change the pressure data for the respective spring chambers in accordance with user's operation with respect to the operation portion; instruct the reaction force calculator to calculate the reaction force data with the changed pressure data; instruct the reaction force storage to store the reaction force data calculated by the reaction force calculator; instruct the graph generating unit to generate the reaction force curve with the reaction force data read from the reaction force data storage; and display the generated reaction force curve on the display screen.

2. The portable terminal according to claim 1,
   wherein the controller holds reaction force data including the pressure data of the respective spring chambers in the pressure data storage unit as custom setting of the user when registration operation is performed with the changed pressure data of the respective spring chambers.

3. The portable terminal according to claim 2,
   wherein the graph generating unit generates the graph of the reaction force characteristics by using the pressure data of the custom setting stored in the pressure data storage unit in accordance with a display operation of the graph of the reaction force characteristics performed to the graphic user interface unit.

4. The portable terminal according to claim 1, further comprising:
   a monitoring unit which sequentially displays pressure data acquired from pressure sensors provided in the respective spring chambers on the screen for adjusting the reaction force in accordance with a monitoring operation performed to the graphic user interface unit.

5. The portable terminal according to claim 1,
   wherein the controller displays a contents list screen having a button group which can realize an access to information concerning setting including a reaction force adjustment and a selection operation for switching the function by the user.

6. The portable terminal according to claim 1, further comprising:
   a switching operation unit for displaying or hiding the graph generated by the graph generating unit.

7. A non-transitory computer readable medium storing a program allowing a portable terminal supporting reaction force adjustment of a suspension mechanism having plural spring chambers in which spring pressures can be individually adjusted to execute processing, which allows the portable terminal to function as:
   a pressure data storage unit storing pressure data of the respective spring chambers;
   a graphic user interface unit displaying a display screen which can be directly operated by a user;
   a reaction force calculator calculating reaction force data by using the pressure data of the respective spring chambers stored in the pressure data storage unit;
   a reaction force data storage storing the reaction force data calculated by the reaction force calculator;
   a graph generating unit generating a graph of reaction force characteristics by using the reaction force data calculated by the reaction force calculator; and
   a controller displaying a screen for adjusting a reaction force where the screen has an operation portion for adjusting the spring pressures provided for the respective spring chambers and a drawing area of the graph on the display screen, wherein
   the graph of reaction force characteristics includes a reaction force curve,
   the controller is configured to: change the pressure data for the respective spring chambers in accordance with user's operation with respect to the operation portion; instruct the reaction force calculator to calculate the reaction force data with the changed pressure data; instruct the reaction force storage to store the reaction force data calculated by the reaction force calculator; instruct the graph generating unit to generate the reaction force curve with the reaction force data read from the reaction force data storage; and display the generated reaction force curve on the display screen.

8. A reaction force adjustment support method by a portable terminal supporting reaction force adjustment of a suspension mechanism having a plural of spring chambers in which spring pressures can be individually adjusted, the method comprising the steps of:
   storing pressure data of the respective spring chambers;
   calculating reaction force data by using the pressure data of the respective spring chambers stored in a pressure data storage unit when an instruction for drawing a graph of reaction force characteristics is made with respect to a graphic user interface unit displaying a display screen which can be directly operated by a user;
   storing the reaction force data calculated by the reaction force calculator;
   generating the graph of the reaction force characteristics by using the calculated reaction force data; and
   displaying a screen for adjusting a reaction force where the screen has an operation portion for adjusting the spring pressures provided for the respective spring chambers and a drawing area of the graph on the display screen, wherein
the graph of the reaction force characteristics includes a reaction force curve, and
the potable terminal contains a controller that is configured to: change the pressure data for the respective spring chambers in accordance with user's operation with respect to the operation portion; instruct the reaction force calculator to calculate the reaction force data with the changed pressure data; instruct the reaction force storage to store the reaction force data calculated by the reaction force calculator; instruct the graph generating unit to generate the reaction force curve with the reaction force data read from the reaction force data storage; and display the generated reaction force curve on the display screen.

9. A reaction force support system comprising:
plural spring chambers in which spring pressures can be individually adjusted; and
a portable terminal that contains:
   a pressure data storage unit storing pressure data of the respective spring chambers;
   a graphic user interface unit displaying a display screen which can be directly operated by a user;
   a reaction force calculator calculating reaction force data by using the pressure data of the respective spring chambers stored in the pressure data storage unit;
   a reaction force data storage storing the reaction force data calculated by the reaction force calculator;
   a graph generating unit generating a graph of reaction force characteristics by using the reaction force data calculated by the reaction force calculator; and
   a controller displaying a screen for adjusting a reaction force where the screen has an operation portion for adjusting the spring pressures provided for the respective spring chambers and a drawing area of the graph on the display screen, wherein
the graph of reaction force characteristics includes a reaction force curve,
the controller is configured to change the pressure data for the respective spring chambers in accordance with user's operation using the operation portion and to vary the reaction force curve based on the pressure data changed for the respective spring chambers, and
the spring pressures are adjusted by the user's operation using the operation portion.

10. The portable terminal according to claim 1, wherein the operation portion is comprised of plural slide bars which correspond to the respective spring chambers and are configured to change the pressure data in the respective spring chambers.

11. The portable terminal according to claim 10, wherein numerals and units corresponding to positions of respective slide bars are displayed on the display screen.

12. The portable terminal according to claim 10, wherein the respective pressure data is changed in accordance with sliding amounts of the slide bars.

* * * * *